United States Patent [19]

Carmien

[11] Patent Number: 5,123,304
[45] Date of Patent: Jun. 23, 1992

[54] PROCESS FOR ATTACHING TOOL HEADS TO ENDS OF COMPOSITE HANDLES

[75] Inventor: Joseph A. Carmien, Beverly Hills, Calif.

[73] Assignee: Nupla Corporation, Sun Valley, Calif.

[21] Appl. No.: 712,690

[22] Filed: Jun. 10, 1991

[51] Int. Cl.$^5$ ............... B21K 11/14; B21K 29/00
[52] U.S. Cl. ............... 76/111; 76/103; 76/109; 76/113; 403/265
[58] Field of Search ............. 76/111, 113, 103, 109, 76/119, 104.1, 106; 403/265, 266, 267, 268; 29/527.1, 460; 264/249

[56] References Cited

U.S. PATENT DOCUMENTS

| | | | |
|---|---|---|---|
| Re. 32,364 | 2/1987 | Carmien . | |
| 2,052,616 | 9/1936 | Gardes | 264/249 |
| 2,948,649 | 8/1960 | Pancherz . | |
| 3,018,140 | 1/1962 | Portz et al. | 403/268 |
| 3,232,355 | 2/1966 | Woolworth . | |
| 3,549,189 | 12/1970 | Alosi . | |
| 3,556,888 | 1/1971 | Goldsworthy . | |
| 4,050,727 | 9/1977 | Bonnes | 403/268 |
| 4,570,988 | 2/1986 | Carmien . | |
| 4,605,254 | 8/1986 | Carmien . | |
| 4,639,029 | 1/1987 | Kolonia . | |

FOREIGN PATENT DOCUMENTS 0129611 10/1950 Sweden ............... 264/249

Primary Examiner—Roscoe V. Parker
Attorney, Agent, or Firm—Kelly, Bauersfeld & Lowry

[57] ABSTRACT

A process for assembling a hand tool includes the steps of heating an elongated tang element fixed relative to the tool head, aligning a front end of a composite tool handle with a rearwardly extending portion of the tang element, and driving the heated tang element into the tool handle. The tool handle includes a thermoplastic section in proximity to the front end thereof, having an elongate tang receiving channel. The heated tang element is driven into the tang receiving channel such that as the tang element engages the tool handle, the thermoplastic section surrounding the tang receiving channel is softened and flows into intimate contact around the tang element and then hardens as the heat of the tang element is dissipated to hold the tang element in place. In one preferred form, the tang element forms a portion of the tool head which is heated and then positioned in a stationary jig. A tool handle is placed on a track in alignment with the jig and a rear end of the tool handle is engaged to drive the heated tang element into the tang receiving channel. In another preferred form, the tang element is secured to a frog for a shovel blade. The frog is positioned within a back-side cavity of the shovel blade so that the tang element extends into a shovel blade socket. The tool handle is aligned with the tang element by inserting the handle front end into the shovel blade socket, prior to driving the tang element into the tang receiving channel.

29 Claims, 4 Drawing Sheets

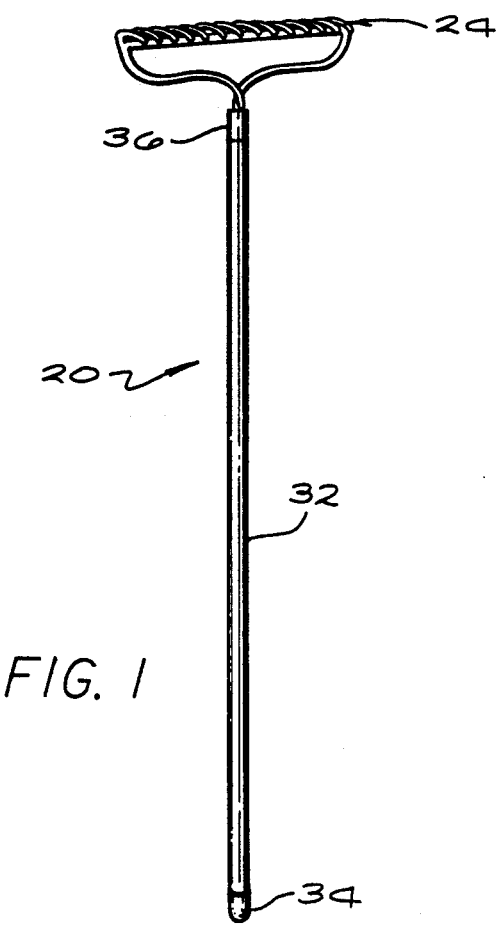
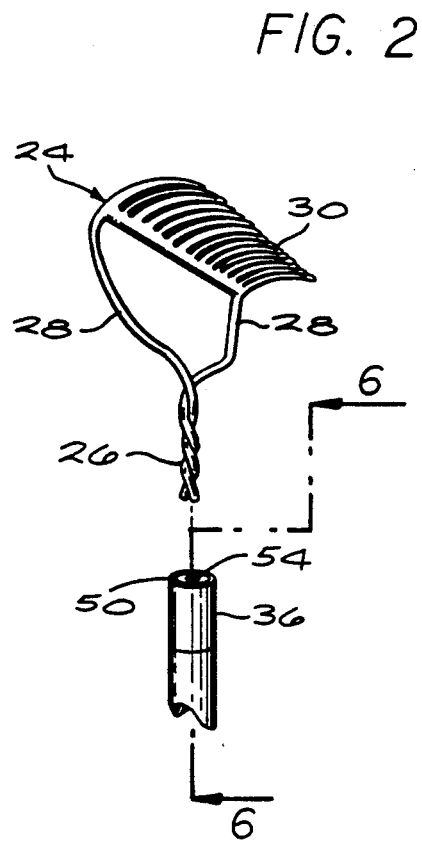
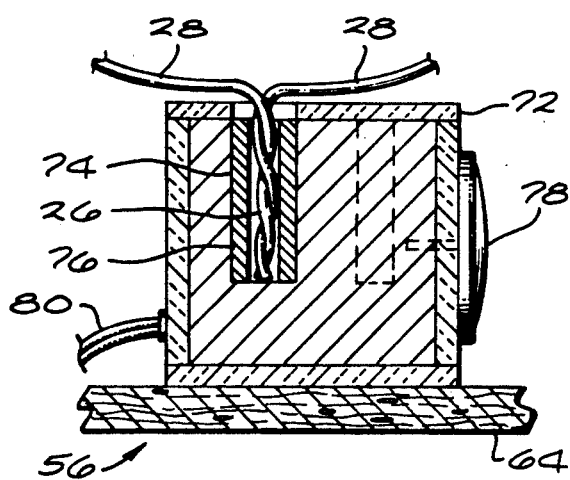
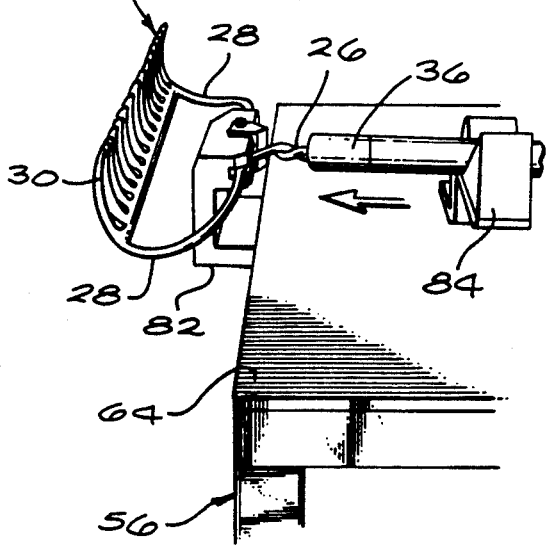

PROCESS FOR ATTACHING TOOL HEADS TO ENDS OF COMPOSITE HANDLES

BACKGROUND OF THE INVENTION

This invention relates generally to processes for assembling hand tools. More specifically, the present invention relates to a novel process for attaching tool heads to ends of composite handles.

In manufacturing handles for hand tools such as shovels, rakes and the like, competing design considerations are at play. On the one hand, it is desirable to have a handle that is as light as possible, to provide for easy use by consumers. On the other hand, the handle must have the structural integrity to withstand the variety of stresses that will be placed on it. Wooden handles have been used, but these provide an unacceptable compromise of weight for structural integrity or visa versa.

An alternative to wooden handles is the use of rods formed from resin coated fibers. The basic technique for running filaments through a resin bath and then into a long heated die tube to produce a cured composite of the same shape as the die tube has been known for some time. See, for example, U.S. Pat. Nos. 2,948,649 and 3,556,888. This method, however, produces a solid extruded product which is unacceptably heavy and/or too rigid.

The weight problem can be alleviated by means of an existing process to extrude hollow tubes utilizing a die tube with the center filled, leaving an annular cross-section through which the fibers are pulled. However, this weight reduction is achieved at the cost of significantly lower tensile and compression (bending) strength than that of a solid rod, and therefore would not be suitable for use in certain high-stress applications such as general purpose shovel handles. Further, to increase interlaminar strength, a substantial percentage of fibers running other than in a longitudinal direction may be required. Moreover, commercial machines for producing continuous hollow tubing are extremely expensive.

As illustrated and described in U.S. Pat. Nos. 4,570,988 and 4,605,254 (the contents of which are incorporated herein by reference), the bending strength of tool handles can be improved by producing rods which are substantially hollow or lightweight throughout most of their length, but reinforced at areas of expected increased stresses. Typically, one of the areas to be reinforced in a hand tool is at the front end, where the attachment between the tool head and the handle is effected.

Many hand tools such as hoes, cultivators, rakes and the like, are provided with tangs or an elongated piece of metal which is part of the tool head and is used traditionally to attach the tool head to a wood handle. There are millions of such tool heads in existence which may be reused with replacement tool handles. To attach such tanged tool heads to composite handles, typically a bore is provided in the front end of the composite tool handle having a diameter larger than the cross-sectional dimensions of the tang itself. The tang is attached to the composite rod by bonding or chemically adhering the tang within the bore. This process, however, has been found to be unacceptably costly and time consuming, and not well suited for field repair or replacement of wooden tool handles.

Problems have also been encountered in the attachment of composite tool handles to socketed tool heads, such as shovel blades, as described in U.S. Pat. No. Re. 32,364. A large percentage of shovel blades are made by starting with a sheet steel blank, and stamping out the configuration of a shovel with the appropriate shape for a digging portion, the socket, and the structural stiffening sections. The traditional process of forming a shovel blade creates a substantial back-side cavity or hollowed-out area between the end of the shovel socket and approximately the center of the blade. This cavity or recess is very undesirable in anything but the cheapest shovels, as it is prone to collect dirt, clay, mud or other materials during use, which adds substantially to the weight of the shovel.

To eliminate or substantially reduce this backside cavity, shovel blades are modified into what is called a closed back (as opposed to an open back) configuration. This is accomplished by means of welding a roughly triangular steel plate over the cavity. This process substantially increases the costs associated with manufacturing a closed back shovel blade, since there is an additional ten to fifteen inches of welding, slag cleaning, and further re-heat treating or annealing of the shovel blade to eliminate brittle spots caused by the welding process.

When utilizing wood handles with closed and open' back shovel blades, the length of the blade socket has grown over the years to accommodate the decreasing strength of available wood handle materials. Much of the material utilized for the socket can be eliminated as wasteful, however, when a superior strength composite handle is utilized in place of wood. In the past, however, composite-type handles have been attached to the shovel blade by means of a screw, rivet or the like, which mechanically attaches the front end of the tool handle to the shovel socket. In some limited instances, even this method of attachment can undesirably degrade the overall strength and working characteristics of the tool handle.

Accordingly, there has been a need for a novel process for attaching tool heads to ends of composite handles which simplifies prior processes, eliminates the waiting time associated with bonding processes, and facilitates the rapid assembly of hand tools to increase manufacturing cost efficiencies. Such a novel process should permit the assembly of a tanged tool head to a composite rod in a quick and efficient manner, without the need for special treatment or storage of the assembled hand tool immediately following assembly. Such an assembly process must provide a means for securely holding the tool head relative to the handle under all anticipated working conditions. Moreover, a novel assembly process is needed which can be utilized to quickly and efficiently provide a closed back shovel simultaneously with attaching the composite handle to the shovel blade. The present invention fulfills these needs and provides other related advantages.

SUMMARY OF THE INVENTION

The present invention resides in a novel process for attaching tool heads to ends of composite handles, which provides a highly efficient and economical method for assembling a broad range of hand tools. The process of the present invention comprises the steps of heating an elongated tang element fixed relative to a tool head and extending generally rearwardly therefrom, and aligning a front end of a composite tool handle including a thermoplastic section, with the rearwardly extending tang element. The heated tang element is then driven into the thermoplastic section such that as the heated tang element engages the tool handle, the thermoplastic section is softened to permit entry of the tang element. The thermoplastic material of the thermoplastic section flows into intimate contact around the tang element and then hardens as the heat of the tang element is dissipated to hold the tang element in place.

In one preferred form of the invention, the tang element comprises an integral portion of the tool head as, for example, a rake head. The tang element is heated in a heating block to a temperature within the range of 300° F. to 500° F. prior to alignment with the tool handle, depending on the thermoplastic selected.

The thermoplastic section of the tool handle is provided with an elongate tang receiving channel. The cross-sectional dimensions of the tang receiving channel are less than the cross-sectional dimensions of the tang element to provide suitable interference between the tang element and the tool handle when the tang element is driven into the thermoplastic section. Preferably the interference between the cross-sectional dimensions of the tang element and cross-sectional dimensions of the tang receiving channel is within the range of 0.015 inch to 0.025 inch.

After the tang element has been heated into an acceptable temperature range, the tool head is placed in a stationary jig wherein the rearwardly extending elongated tang element is placed in alignment with the front end of the composite tool handle which is, itself, placed in a track. A cosmetic ferrule is placed over the front end of the tool handle, and a grip is placed over the rear end of the tool handle. When so situated, the rear end of the grip is engaged by a pneumatic plunger or the like, to drive the grip over the rear end of the tool handle and move the tool handle along the track toward the stationary tool head. This has the effect of driving the heated tang element into the thermoplastic section to quickly and efficiently attach to the tool head to the end of the composite handle.

In another preferred form of the invention, the tang element is not integrally formed with the tool head, but is rather secured to a secondary element, for example a plunger frog for a shovel blade. As before, the tang element is heated within a heating block to a temperature within the range of 300° F to 500° F, and then the frog is positioned within a back-side cavity of the shovel blade such that the tang element extends into a socket of the shovel blade. The tang element, frog and shovel blade are then placed in a stationary jig.

A composite tool handle is then placed in a track as discussed above. Again, the composite tool handle includes a thermoplastic section in proximity to a front end thereof, including a tang receiving channel having cross-sectional dimensions less than the cross-sectional dimensions of the tang element within the range of 0.015 inch to 0.025 inch.

The shovel blade is aligned with the tool handle by inserting the front end of the tool handle into the shovel blade socket. A high strength compression collar or ring may be mounted at the mouth of the socket to preclude the socket from opening under loads. This positions the heated tang element adjacent to and in alignment with the tang receiving channel. When so positioned, the rear end of the tool handle may be engaged to move the tool handle along the track towards the stationary tool head. This has the effect of driving the heated tang element into the tang receiving channel such that as the tang element engages the tool head, the thermoplastic section surrounding the tang receiving channel is softened and flows into intimate contact around the tang element and then hardens as the heat of the tang element is dissipated to hold the tang element in place. Advantageously, the frog provides a filler for the back side cavity of the shovel blade and eliminates the requirement of additional manufacturing steps to form a closed-back shovel.

Other features and advantages of the present invention will become apparent from the following more detailed description, taken in conjunction with the accompanying drawings which illustrate, by way of example, the principles of the invention.

BRIEF DESCRIPTION OF THE DRAWINGS

The accompanying drawings illustrate the invention. In such drawings:

FIG. 1 is a perspective view of a hand tool in the form of a rake, manufactured in accordance with the present invention;

FIG. 2 is an enlarged, fragmented exploded perspective view of a front end of the rake illustrated in FIG. 1, showing the relation of a tang element to a front end of the rake handle;

FIG. 4 is an enlarged fragmented sectional view taken generally along the line 4—4 of FIG. 3, illustrating the manner in which the tang elements of the rake tool heads are heated within the heating block;

FIG. 5 is a perspective view taken generally of the area indicated by the line 5—5 in FIG. 3, illustrating the step of driving the heated tang element into a tang receiving channel provided in the front end of the tool handle;

DETAILED DESCRIPTION OF THE PREFERRED EMBODIMENTS

Figure 10:
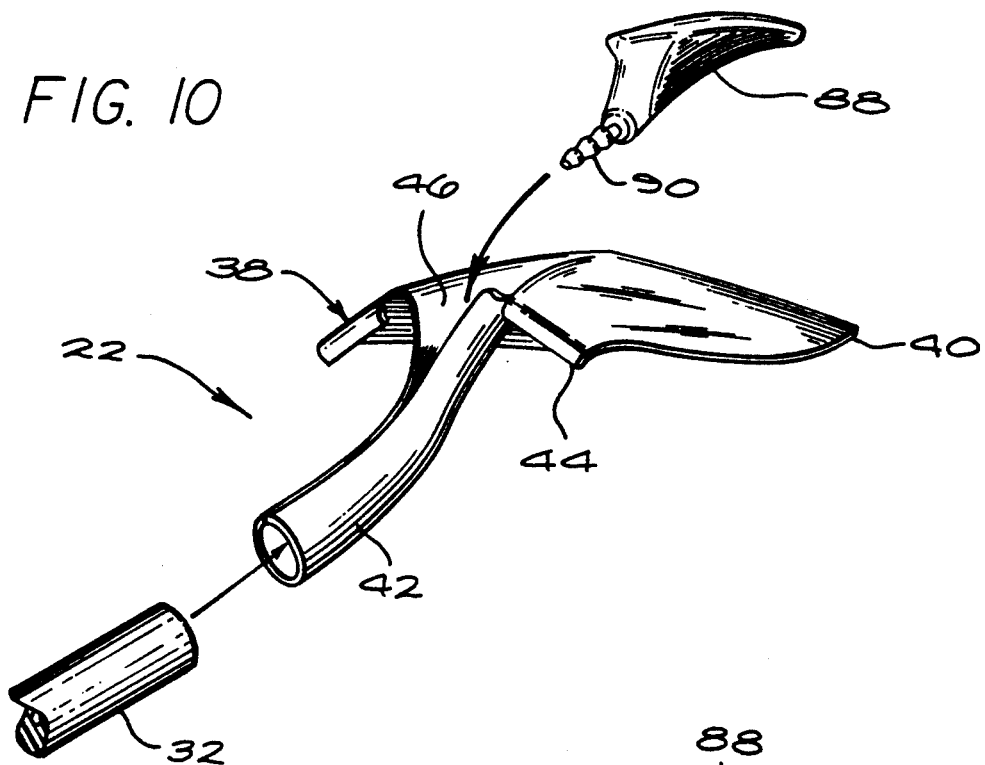
FIG. 10 is an exploded perspective assembly view illustrating the manner in which the process of the present invention is utilized to attach a socketed tool head, such as a shovel blade, to a tool handle utilizing the process of the present invention.
Figure 11:
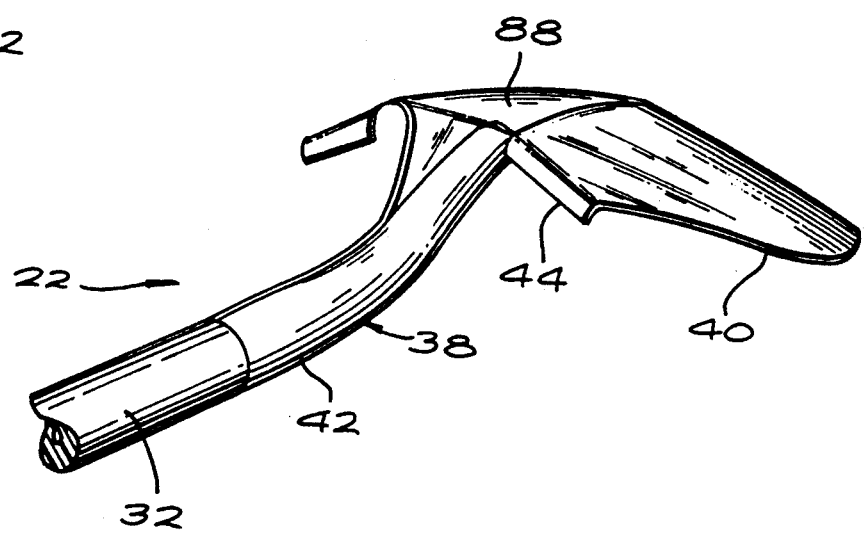
FIG. 11 is a perspective view similar to FIG. 10, illustrating the configuration of a frog and the tool handle as assembled to the shovel blade.
Figure 12:
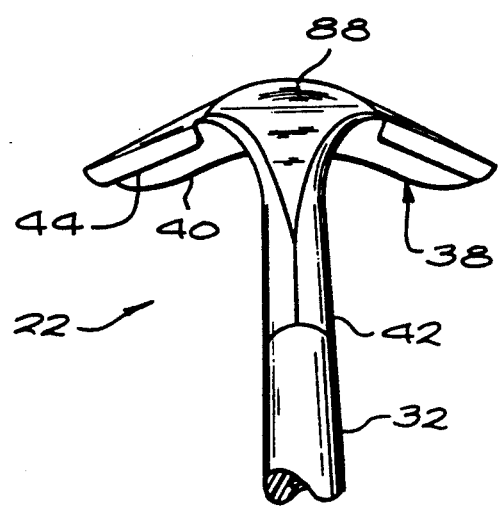
FIG. 12 is another perspective view of the assembled shovel illustrated in FIGS. 10 and 11.

As shown in the drawings for purposes of illustration, the present invention is concerned with a novel process for assembling a hand tool, illustrating for exemplary purposes as a rake 20 in FIGS. 1-9, and as a shovel 22 in FIGS. 10-12. The rake 20 comprises, generally, a tanged rake head 24 which includes an integrally formed, generally rearwardly extending elongated tang element 26. In the case of the rake head 24, the tang element 26 is simply a twisted portion of the supports 28 for the rake teeth 30. The rake head 24 is attached to a composite tool handle 32 which includes a butt-end grip 34 and a cosmetic ferrule 36 adjacent to the front end of the tool handle 32.

The shovel 22, illustrated in FIGS. 10-12, includes a shovel head 38 comprising a blade portion 40, an integral handle receiving socket 42, and a foot tread 44. The shovel head 38 is typically forged or stamped from a single sheet metal blank and formed into the desired configuration by well known stamping and forming procedures. In order to provide appropriate stiffness for the blade portion 40 relative to the socket 42, a backside cavity 46 adjacent to the socket 42 is usually formed. The socket 42 is dimensioned to receive a composite tool handle 32 similar to that illustrated with respect to the rake 20, but since the front end of the tool handle is to be positioned within the socket 42, there is no need to include a cosmetic ferrule 36. However, to preclude the socket from opening under loads, a high strength compression collar or ring (not shown) may be mounted at the mouth of the socket 42.

As illustrated and described in U.S. Pat. Nos. 4,570,988 and 4,605,254, the composite tool handle 32 is manufactured by drawing a fiber material through a resin bath and into a die tube where the fibers are heated and cured by a heating element surrounding the die tube. The cured rod is pulled out of the die tube by tractor type pullers and cut to the desired length by a conventional cutting device. As the fibers enter the die tube, alternating sections of lightweight tubing 48 and reinforcing core 50 are inserted into the center of the die tube and are simultaneously surrounded by the fibers and drawn into and through the die tube. By this method, a continuous hollow fiberglass rod 52 can be quickly and easily manufactured with a reinforced section integrally included at any desired location. For purposes of the present invention, at least one section of reinforcing core 50 within the fiberglass rod 52 should be located at the front end of the composite tool handle 32.

In accordance with the present invention, and as illustrated with respect to a process for attaching a tanged tool head to the end of a composite handle as illustrated in FIGS. 1-9, the present invention, in its simplified form, comprises the steps of heating the tang element 26, aligning a front end of the composite tool handle 32 with the rearwardly extending tang element, and driving the heated tang element into the reinforcing core 50 at the front end of the composite tool handle 32. The reinforcing core is preferably formed of a thermoplastic material such as polystyrene so that as the heated tang element 26 engages the tool handle 32, the thermoplastic reinforcing core 50 is softened to permit entry of the tang element whereby the thermoplastic material flows into intimate contact around the tang element and then hardens as the heat of the tang element is dissipated to hold the tang element in place.

Figure 6:
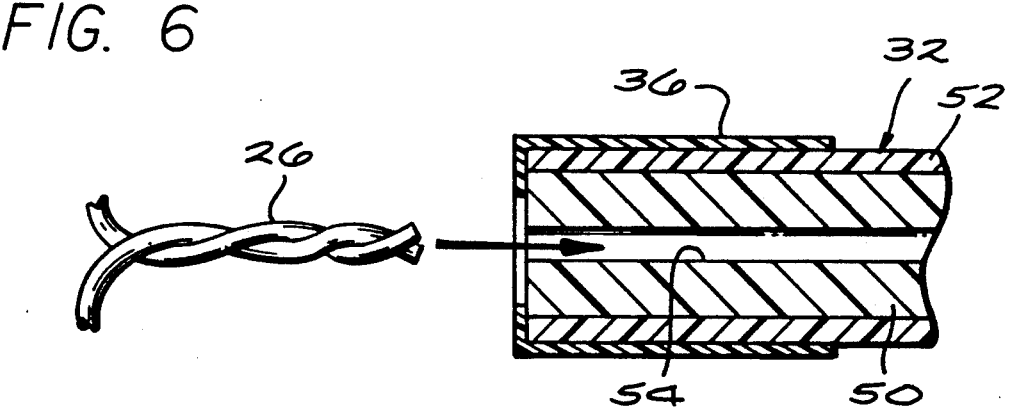
FIG. 6 is an enlarged, partially sectional view taken generally along the line 6—6 of FIG. 2, illustrating alignment of the tang element with the tang receiving channel prior to assembly of the tool head with the tool handle.
Figure 7:
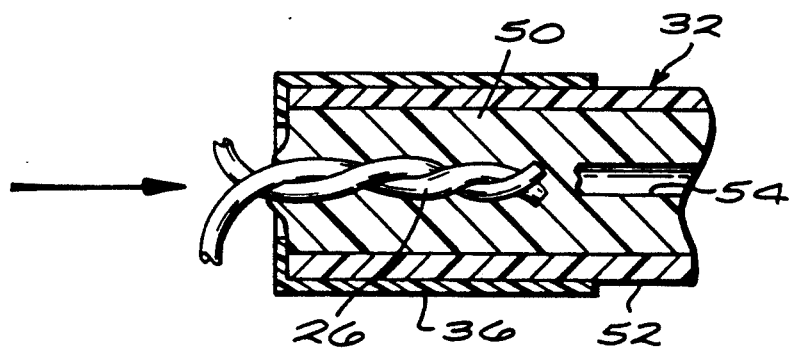
FIG. 7 is a sequential assembly view similar to that illustrated in FIG. 6, illustrating the positioning of the tang element within the tang receiving channel, and particularly showing the result of the tang receiving channel being softened and flowing into intimate contact around the tang element, and then hardening as the heat of the tang element is dissipated to hold the tang element in place.
Figure 8:
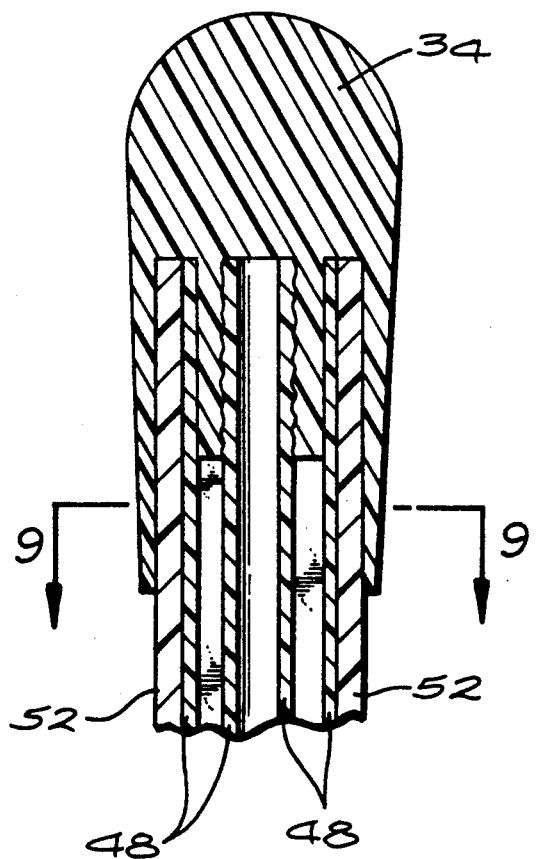
FIG. 8 is an enlarged, fragmented sectional view of a butt end of the tool handle.
Figure 9:
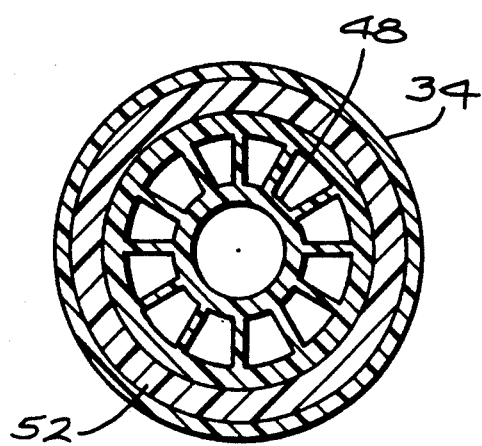
FIG. 9 is an enlarged sectional view taken generally along the line 9—9 of FIG. 8.

More specifically, as illustrated in FIGS. 2, 6 and 7, the thermoplastic core 50 within the fiberglass rod 52 at the front end of the composite tool handle 32 is provided with an elongate tang receiving channel 54 which extends generally coaxially with the longitudinal axis of the tool handle. The tang receiving channel 54 preferably has cross-sectional dimensions which are less than the cross-sectional dimensions of the tang element 26. This ensures at least a minimal level of interference between the thermoplastic core 50 and the heated tang element 26 when the tang element is driven into the tool handle. This interference is typically within the range of 0.015 inch to 0.025 inch, and ideally about 0.020 inch.

Figure 3:
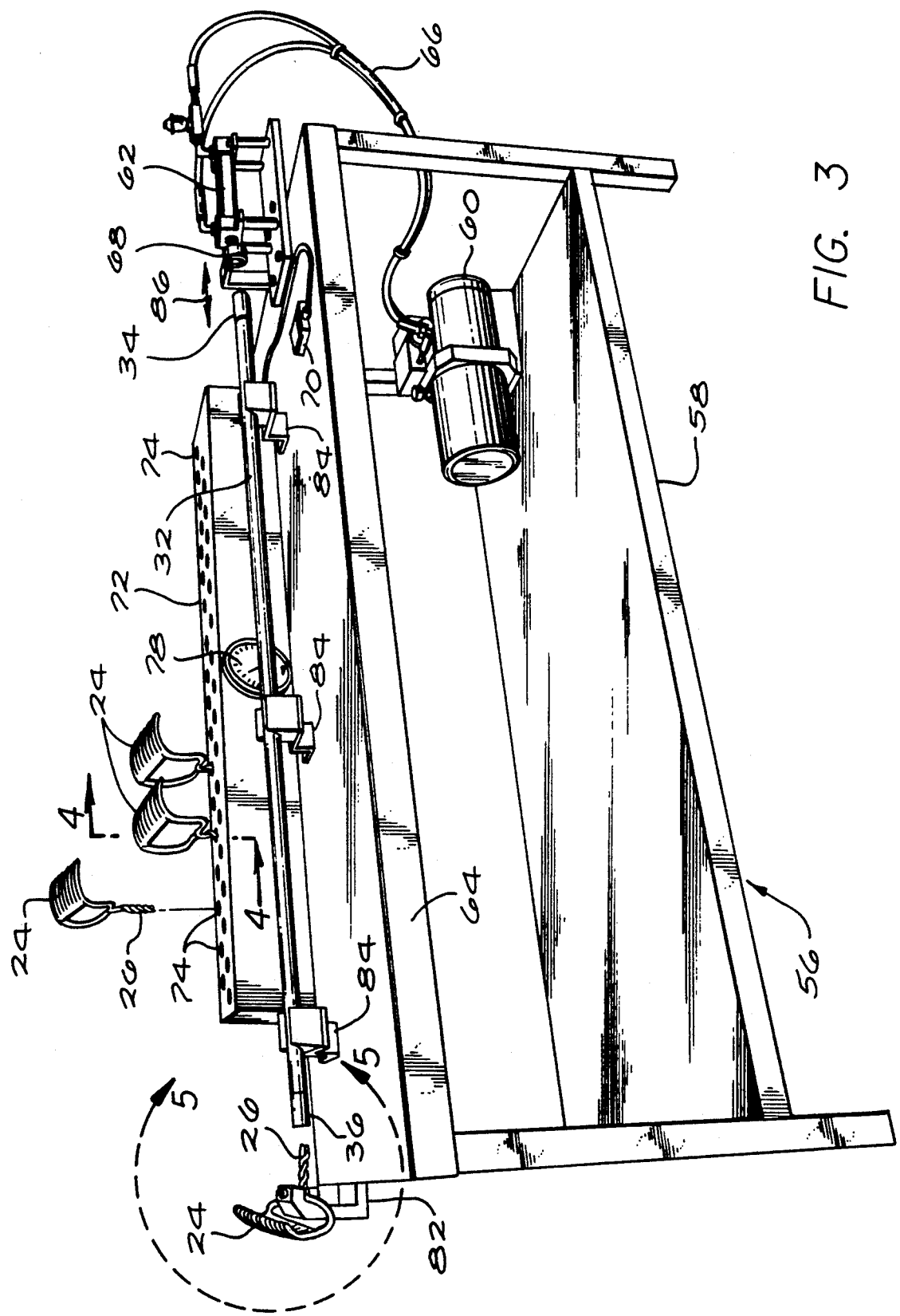
FIG. 3 is a perspective view of an apparatus utilized for assembling hand tools in accordance with the present invention, illustrating a portable table which provides a track for the tool handle, a jig for holding a tool head in stationary alignment with the tool handle, a pneumatic or hydraulic driver at a rear end of the tool handle, and a heating block for heating the tang elements of a plurality of tool heads.

The process for assembling a hand tool in accordance with the present invention is shown broadly in FIGS. 3-5. Here a portable table 56 is utilized for the assembly process. The table 56 supports, on a lower shelf 58, a motor/compressor 60 for a pneumatic plunger 62 fixed to one end of an upper shelf 64 of the table. The plunger 62 is operatively connected to the motor/compressor 60 by means of a pair of hoses 66. Actuation of a piston mechanism 68 of the plunger 62 is controlled by means of a switch 70 which can be either hand or foot actuated. Of course, any device capable of generating a force sufficient to actuate the piston mechanism 68 may be utilized, such as an hydraulic plunger.

An aluminum heating block 72 is supported on the upper shelf 64 of the table 56, and includes a plurality of tang element receiving holes 74 extending downwardly from an upper surface thereof. These receiving holes 74 are configured to receive and support therein the tang elements 26 of a plurality of rake heads 24. As shown in FIG. 4, in order to ensure maximum heat transfer between the heating block 72 and the tang elements 26, aluminum bushings 76 can be provided to minimize the air gap between the heating block and the respective tang element. A thermometer 78 is provided to permit an operator to monitor the temperature of the heating block 72, in order to heat the tang elements 26 within a desired temperature range. Heat is generated within the heating block 72 in a conventional manner utilizing power drawn through an electrical power cord 80. For purposes of the present invention, the tang element 26 of the rake head 24 must be heated to a temperature sufficient to cause the thermoplastic material of the reinforcing core 50 surrounding the tang receiving channel 54 to flow into intimate contact with the tang element 26 as it is driven into the tool handle 32. Accordingly, it is preferred that the tang element 26 is heated to a temperature within the range of 300° F. to 500° F., depending on the thermoplastic selected.

When the tang element 26 has been so heated, the rake head 24 is removed from the heating block 72 and securely placed within a stationary jig 82 fixed to the table 56 opposite to the piston mechanism 68 of the plunger 62. A plurality of track-forming guides 84 are fixed to the upper shelf 64 of the table 56, to provide a track for the tool handle 32 extending between the plunger 62 and the jig 82. The rake head 24 is held within the jig 82 such that when the tool handle 32 is placed upon the guides 84, the tang element 26 is aligned with the tang receiving channel 54. The cosmetic ferrule 36 can be placed over the front end of the tool handle 32 at any time prior to driving the tang element 26 into the thermoplastic core 50 of the tool handle 32.

To maximize efficiency of the assembly process of the present invention, it is desirable to secure the grip 34 to the butt end of the tool handle 32 simultaneously with the step of attaching the rake head 24 to the tool handle. In order to accomplish this, the grip 34 is positioned in line with the butt end of the tool handle 32 so that when the plunger 62 is activated to cause the piston mechanism 68 to engage the tool handle 32 and drive it onto the tang element 26, the grip 34 is simultaneously driven over and into the butt end of the tool handle (see FIGS. 8 and 9).

The piston mechanism 68 reciprocates in and out of the plunger apparatus 62 as indicated by the arrow 86 in FIG. 3. Thus, when the switch 70 is pressed by an operator, the piston mechanism 68 directly engages the grip 34 and thereby slides the tool handle 32 along the track formed by the guides 84 toward the rake head 24 held within the stationary jig 82. The heated tang element 26 softens the thermoplastic material of the reinforcing core 50 surrounding the tang receiving channel 54, whereby the thermoplastic material flows into intimate contact around the tang element 26 (FIG. 7). The thermoplastic material will conduct heat away from the tang element 26 and harden as the heat of the tang element is dissipated to hold the tang element in place. Accordingly, the rake is fully assembled in one continuous operation.

With reference now to FIGS. 10–12, the same conceptual process can be utilized to attach a composite tool handle 32 to a socketed tool head, such as the shovel head 38. To accomplish this, a plunger frog 88 is provided for substantially filling the back-side cavity 46 of the shovel head 38. A tang element 90 having surface irregularities is secured within the frog 88 and positioned so as to extend generally centrally into the socket 42 of the shovel head 38 when the frog is positioned within the back-side cavity 46. The tang element 90, which may have a non-circular cross-section, may be fixed into the frog 88 as an insert when molded, or may be heated and driven into the frog in a manner similar to the process described above.

In a manner similar to the process discussed above in connection with the rake 20, to assemble a shovel 22 utilized in the process of the present invention, the tang element 90 is first heated to a temperature within the range of 300° F. to 500° F. in a heating block 72. When so heated, the frog 88 and the attached heated tang element 90 are positioned within the back-side cavity 46 and socket 42 of the shovel head 38. The sub-assembly of the frog 88, tang element 90 and shovel head 38 is placed within a suitable jig. The composite tool handle 32 is then aligned with the shovel head 38 so that a front end is placed within a rear opening of the socket 42, to place the tang receiving channel 54 within the reinforcing core 50 in alignment with the tang element 90. The tool handle 32 is then driven into the socket 42 so that the tang element 90 is forced into the tang receiving channel 54. Again, the thermoplastic material of the thermoplastic core 50 surrounding the tang receiving channel 54 flows into intimate contact around the tang element 90 and then hardens as the heat of the tang element is dissipated to hold the tang element in place. An apparatus similar to that illustrated in FIG. 3 can be advantageously utilized, and a grip 34 can also be placed on the butt end of the tool handle 32 in one simplified operation.

From the foregoing it is to be appreciated that the novel process for assembling a hand tool as described in detail above provides an efficient means for attaching tool heads to ends of composite handles. Since the use of epoxy and other bonding agents has of the hand tools immediately following assembly as has heretofore been required. Accordingly, labor costs associated with the assembly of hand tools is significantly decreased. Moreover, the present invention provides a highly efficient process for manufacturing a closed-back shovel since, the prior required process of welding a cover over the back-side cavity 46, grinding off the slag and annealing the shovel head 38 has been eliminated through the simple use of a frog 88. The frog 88 further simplifies attachment of the tool handle 32 to the tool head 38, utilizing the process of driving a heated tang element 90 into a tang receiving channel 54 provided in a thermoplastic section of the tool handle 32.

Although two particular embodiments of the invention have been described in detail for purposes of illustration, various modifications may be made without departing from the spirit and scope of the invention. Accordingly, the invention is not to be limited, except as by the appended claims.

I claim:

1. A process for assembling a hand tool, the steps comprising:

heating an elongated tang element fixed relative to a tool head and extending generally rearwardly therefrom;

aligning a front end of a composite tool handle including a thermoplastic section, with the rearwardly extending tang element; and driving the heated tang element into the thermoplastic section such that as the heated tang element engages the tool handle, the thermoplastic section is softened to permit entry of the tang element whereby the thermoplastic material of the thermoplastic section flows into intimate contact around the tang element and then hardness as the heat of the tang element is dissipated to hold the tang element in place;

wherein the tang element comprises a portion of the tool head and is heated in a heating block prior to alignment with the tool handle, and wherein the step of aligning the composite tool handle with the tang element includes the steps of placing the tool handle in a track, removing the tool head from the heating block, and placing the tool head in a stationary jig.

2. A process as set forth in claim 1, wherein the tang element is heated to a temperature within the range of 300° F. to 500° F.

3. A process as set forth in claim 1, wherein the step of driving the heated tang element into the thermoplastic section includes the step of engaging a rear end of the tool handle and moving the tool handle along the track toward the stationary tool head.

4. A process as set forth in claim 3, including the step of placing a cosmetic ferrule over the front end of the tool handle prior to driving the heated tang element into the thermoplastic section.

5. A process as set forth in claim 3, including the step of driving a grip over the rear end of the tool handle during the step of driving the heated tang element into the thermoplastic section.

6. A process as set forth in claim 3, including the step of providing an elongate tang receiving channel in the thermoplastic section of the tool handle such that the cross-sectional dimensions of the tang receiving channel are less than the cross-sectional dimensions of the tang element, wherein during the step of aligning the tool handle with the tang element the heated tang element is positioned adjacent to and in alignment with the tang receiving channel, and wherein during the step of driving the tang element into the thermoplastic section the thermoplastic material surrounding the tang receiving channel is softened and flows into intimate contact around the tang element.

7. A process as set forth in claim 6, wherein the interference between the cross-sectional dimensions of the tang element and the cross-sectional dimensions of the tang receiving channel is within the range of 0.015 inch to 0.025 inch.

8. A process as set forth in claim 1, including the steps of securing the tang element to a frog for a shovel blade, and positioning the frog within a back-side cavity of the shovel blade such that the tang element extends into a socket of the shovel blade.

9. A process as set forth in claim 8, wherein the step of aligning the tool handle with the tang element includes the step of inserting the front end of the tool handle into the shovel blade socket.

10. A process for assembling a hand tool, the steps comprising:
    placing a composite tool handle in a track, wherein the tool handle includes a thermoplastic section in proximity to a front end thereof, and wherein the thermoplastic section includes an elongate tang receiving channel;
    heating an elongated tang element having cross-sectional dimensions greater than the cross-sectional dimensions of the tang receiving channel, wherein the tang element is secured to a frog for a socketed tool head and extends generally rearwardly therefrom;
    positioning the frog such that the tang element extends rearwardly into the socket;
    aligning the tool head with the tool handle such that the heated tang element is positioned adjacent to and in alignment with the tang receiving channel; and
    driving the heated tang element into the tang receiving channel such that as the tang element engages the tool handle, the thermoplastic section surrounding the tang receiving channel is softened and flow into intimate contact around the tang element and then hardens as the heat of the tang element is dissipated to hold the tang element in place.

11. A process as set forth in claim 10, wherein the step of aligning the tool head with the tool handle includes the step of inserting the front end of the tool handle into the socket.

12. A process as set forth in claim 11, wherein the tang element is heated in a heating block to a temperature within the range of 300° F. to 500° F. prior to being positioned within the socket.

13. A process as set forth in claim 12, including the step of placing the assembled socketed tool head and frog in a stationary jig prior to the step of inserting the front end of the tool handle into te socket.

14. A process as set forth in claim 13, wherein the step of driving the heated tang element into the tang receiving channel includes the step of engaging a rear end of the tool handle and moving the tool handle along the track toward the assembled socketed tool head and frog.

15. A process as set forth in claim 11, wherein the interference between the cross-sectional dimensions of the tang element and the cross-sectional dimensions of the tang receiving channel is within the range of 0.015 inch to 0.025 inch.

16. A process as set forth in claim 10, wherein the tang element comprises a portion of the tool head and is heated in a heating block to a temperature within the range of 300° F. to 500° F. prior to alignment with the tool handle, wherein the step of aligning the tool head with the tool handle includes removing the tool head from the heating block and placing the tool head in a stationary jig, and wherein the step of driving the heated tang element into the tang receiving channel includes the step of engaging a rear end of the tool handle and moving the tool handle along the track toward the stationary tool head.

17. A process as set forth in claim 16, including the step of placing a cosmetic ferrule over the front end of the tool handle prior to the step of driving the heated tang element into the tang receiving channel, and including the step of driving a grip over the rear end of the tool handle during the step of driving the heated tang element into the tang receiving channel.

18. A process as set forth in claim 10, wherein the interference between the cross-sectional dimensions of the tang element and the cross-sectional dimensions of the tang receiving channel is within the range of 0.015 inch to 0.025 inch.

19. A process for assembling a hand tool, the steps comprising:
    heating an elongated tang element within a heating block to a temperature within the range of 300° F. to 500° F.;
    securing the tang element and a tool head fixed relative thereto, within a stationary jig;
    placing a composite tool handle in a track, the tool handle including a thermoplastic section in proximity to a front end thereof, the thermoplastic section including a tang receiving channel having a cross-sectional dimension less than the cross-sectional dimension of the tang element;
    aligning the tool head with the tool handle such that the heated tang element is positioned adjacent to and in alignment with the tang receiving channel; and
    engaging a rear end of the tool handle and moving the tool handle along the track toward the stationary tool head, for driving the heated tang element into the tang receiving channel such that as the tang element engages the tool handle the thermoplastic section surrounding the tang receiving channel is softened and flows into intimate contact around the tang element and then hardens as the heat of the tang element is dissipated to hold the tang element in place.

20. A process as set forth in claim 19, including the steps of securing the tang element to a frog for a shovel blade, positioning the frog within a back-side cavity of the shovel blade such that the tang element extends into a socket of the shovel blade, and inserting the front end of the tool handle into the shovel blade socket.

21. A process as set forth in claim 19, wherein the tang element comprises a portion of the tool head and is heated in a heating block prior to alignment with the tool handle, and after the tang element is heated into the desired temperature range the tool head is removed from the heating block and placed into the stationary jig.

22. A process as set forth in claim 19, including the steps of placing a cosmetic ferrule over a front end of the tool handle prior to the step of driving the heated tang element into the tang receiving channel, and driving a grip over the rear end of the tool handle during the step of driving the heated tang element into the tang receiving channel.

23. A process for assembling a hand tool, the steps comprising:
   securing an elongated tang element to a frog for a shovel blade such that the tang element extends generally rearwardly therefrom;
   heating the elongated tang element;
   positioning the frog within a back-side cavity of the shovel blade such that the tang element extends into a socket of the shovel blade;
   aligning a front end of a composite tool handle including a thermoplastic section, with the rearwardly extending tang element; and
   driving the heated tang element into the thermoplastic section such that as the heated tang element engages the tool handle, the thermoplastic section is softened to permit entry of the tang element whereby the thermoplastic material of the thermoplastic section flows into intimate contact around the tang element and then hardens as the heat of the tang element is dissipated to hold the tang element in place.

24. A process as set forth in claim 23, wherein the step of aligning the tool handle with the tang element includes the step of inserting the front end of the tool handle into the shovel blade socket.

25. A process for assembling a hand too, the steps comprising:
   placing a composite tool handle in a track, wherein the tool handle includes a thermoplastic section in proximity to a front end thereof, and wherein the thermoplastic section includes an elongate tang receiving channel;
   heating an elongated tang element having cross-sectional dimensions greater than the cross-sectional dimensions of the tang receiving channel, wherein the tang element is fixed relative to a tool head and extends generally rearwardly therefrom;
   aligning the tool head with the tool handle such that the heated tang element is positioned adjacent to and in alignment with the tang receiving channel; and
   driving the heated tang element into the tang receiving channel such that as the tang element engages the tool handle, the thermoplastic section surrounding the tang receiving channel is softened and flows into intimate contact around the tang element and then hardens as the heat of the tang element is dissipated to hold the tang element in place;
   wherein the tang element comprises a portion of the tool head and is heated in a heating block to a temperature within the range of 300° F. to 500° F. prior to alignment with the tool handle, wherein the step of aligning the tool head with the tool handle includes removing the tool head from the heating block and placing the tool head in a stationary jig, and wherein the step of driving the heated tang element into the tang receiving channel includes the step of engaging a rear end of the tool handle and moving the tool handle along the track toward the stationary tool head.

26. A process as set forth in claim 25, including the step of placing a cosmetic ferrule over the front end of the tool handle prior to the step of driving the heated tang element into the tang receiving channel, and including the step of driving a grip over the rear end of the tool handle during the step of driving the heated tang element into the tang receiving channel.

27. A process for assembling a composite tool handle to a socketed tool head, the steps comprising:
   securing an elongated tang element to a plug, wherein at least a portion of the plug is capable of passing through a socket for the tool head;
   heating the elongated tang element;
   positioning the plug adjacent to the tool head socket such that the tang element extends into the socket;
   aligning a front end of a composite tool handle including a thermoplastic section, with the tang element; and
   driving the heated tang element into the thermoplastic section such that as the heated tang element engages the tool handle, the thermoplastic section is softened to permit entry of the tang element whereby the thermoplastic material of the thermoplastic section flows into intimate contact around the tang element and then hardens as the heat of the tang element is dissipated to hold the tang element in place.

28. A process as set forth in claim 27, wherein the step of aligning the tool handle with the tang element includes the step of inserting the front end of the tool handle into the tool handle socket.

29. A process as set forth in claim 27, wherein the step of securing the tang element to the plug includes the steps of heating at least a portion of the elongated tang element, and driving the heated portion of the tang element into a thermoplastic section of the plug such that as the heated portion of the tang element engages the plug, the thermoplastic material of the plug in engagement with the heated portion of the tang element is softened to permit entry of the tang element whereby the thermoplastic material flows into intimate contact around the heated portion of the tang element and then hardens as the heat of the tang element is dissipated to hold the tang element in place.

* * * * *

UNITED STATES PATENT AND TRADEMARK OFFICE
CERTIFICATE OF CORRECTION

PATENT NO. : 5,123,304
DATED : June 23, 1992
INVENTOR(S) : Joseph A. Carmien It is certified that error appears in the above-identified patent and that said Letters Patent is hereby corrected as shown below:

In column 3, line 43, delete "plunger" and insert therefor --plug or--.

In column 7, line 31, delete "plunger" and insert therefor --plug or--.

In column 8, line 3, after "has" insert --been eliminated, there is no need for special handling--.

In column 8, line 38, delete "hardness' and insert therefor --hardens--.

In column 9, line 48, delete "flow" and insert therefor --flows--.

In column 9, line 62, delete "te" and insert therefor --the--.

In column 11, line 35, delete "too" and insert therefor --tool--.

Signed and Sealed this

Third Day of August, 1993

Attest:

MICHAEL K. KIRK

*Attesting Officer*    Acting Commissioner of Patents and Trademarks